United States Patent Office 2,854,460
Patented Sept. 30, 1958

2,854,460

1,3-DIOXAN-6-ONES

John H. Hennes, Freeport, Tex., and Donald G. Kundiger, Manhattan, Kans., assignors to The Dow Chemical Company, Midland, Mich., a corporation of Delaware No Drawing. Application August 1, 1957
Serial No. 675,574

4 Claims. (Cl. 260—340.2)

The present invention relates to 1,3-dioxan-6-ones. The new compounds are characterized by the formula

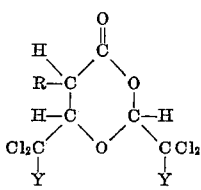

wherein Y represents chlorine, chloromethyl or α-chloroethyl, and R represents a lower alkyl radical. The expression "lower alkyl" is employed in the present specification and claims to refer to an alkyl radical containing from 1 to 4 carbon atoms, inclusive. The new compounds are useful as herbicides and are adapted to be employed as the active toxic constituent of liquid and dust compositions for the control of undesirable vegetation such as water grass and Japanese millet.

The new compounds occur in two forms conveniently referred to hereinafter as the α- and β-isomers. The β-isomer of the new compounds conveniently may be prepared by condensing an alkyl 2-alkyl-3-hydroxy-4,4-x-trichloroalkanoate having the formula

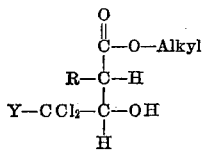

with a polychloroaldehyde in the presence of an acid catalyst such as sulfuric acid. The term "polychloroaldehyde" as herein employed should be understood to refer to a member of the group consisting of chloral, α,α,β-trichloropropionaldehyde and α,α,β-trichlorobutyraldehyde. The reaction takes place smoothly within the temperature range of from 10° to 100° C. Good results are obtained when employing at least one molecular proportion of chloral hydrate and at least ten molecular proportions of acid catalyst for each molecular proportion of alkanoate.

The α-isomer of the new compounds conveniently may be prepared by hydrolyzing a 2,4-bis(haloalkyl)-6,6-dialkoxy-1,3-dioxane having the formula

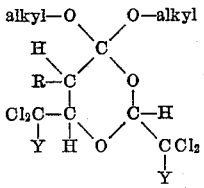

with polyphosphoric acid in the aqueous phase. The reaction takes place smoothly at temperatures of from 40° to 100° C. Good results are obtained when employing at least 25 molecular proportions of polyphosphoric acid for each molecular proportion of dioxane.

In carrying out the reaction to obtain the β-isomer, an alkyl 2-alkyl-3-hydroxy-4,4-x-trichloroalkanoate is mixed or otherwise blended with a polychloroaldehyde in the presence of sulfuric acid and in the reaction temperature range for a period of time to complete the reaction. During the reaction, the desired product oftentimes precipitates as a crystalline solid. Upon completion of the reaction, the mixture is quenched in ice-water to precipitate completely the desired product. The quenched reaction mixture is neutralized with an alkali metal carbonate and the precipiate separated in conventional manner such as by filtration or decantation to obtain the desired product as a crystalline solid. The product may be purified by recrystallization from suitable organic solvents.

In carrying out the present invention to obtain the α-isomers, a 6,6-dialkoxy-1,3-dioxane is mixed or otherwise blended with polyphosphoric acid and the resulting mixture heated in the reaction temperature range for a period of time to complete the reaction. During the reaction, the desired product oftentimes precipitates in the reaction mixture. Upon completion of the reaction, the reaction mixture is quenched with ice-water, and neutralized with an alkali metal salt of a weak acid such as sodium carbonate to obtain the desired product as a crystalline solid. The solid product is separated in a conventional manner such as by filtration or decantation and dried. The dried product may be purified by recrystallization from suitable organic solvents.

The following examples illustrate the invention but are not to be construed as limiting.

*Example 1.—2,4-bis(trichloromethyl)-5-methyl-1,3-dioxan-6-one β-isomer*

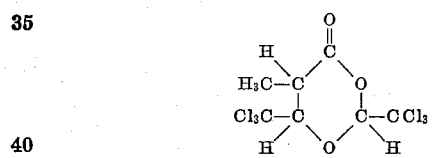

Ethyl 2-methyl-3-hydroxy-4,4,4-trichlorobutyrate (4.9 grams; 0.02 mole), 6.6 grams (0.04 mole) of chloral hydrate and 10 milliliters (0.18 mole) of sulfuric acid were mixed together and allowed to stand at room temperature (25°–30° C.) for 24 hours. During the reaction, a precipitate formed in the reaction mixture. Upon completion of the reaction, the reaction mixture was poured into ice-water and neutralized (pH 7) with sodium carbonate. The precipitate was separated by filtration to obtain a 2,4-bis(trichloromethyl) - 5 - methyl-1,3-dioxan-6-one β-isomer product as a crystalline solid. The product was washed with water, dried, and recrystallized from ethyl alcohol and found to melt at 110.5°–113° C.

*Example 2.—2,4-bis(1,1,2-trichloroethyl)-5-methyl-1,3-dioxan-6-one α-isomer*

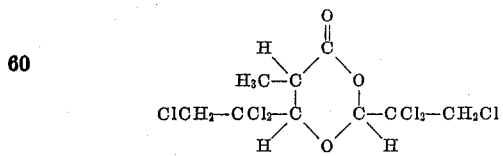

2,4-bis(1,1,2 - trichloroethyl) - 5 - methyl - 6,6-dimethoxy-1,3-dioxane (8.5 grams; 0.02 mole) is mixed with 42.5 grams (115 percent ortho-phosphoric acid equivalent) of polyphosphoric acid and the resulting mixture heated at 85° C. for one hour. Thereafter heating is continued for about 17 hours at a temperature of about 60° C. Upon completion of the reaction, the reaction mixture is quenched in 100 milliliters of ice-water. A white precipitate forms in the reaction mixture and is separated by filtration. The precipitate is washed with an aqueous sodium carbonate solution and water and dried to obtain a 2,4-bis(1,1,2-trichloroethyl)-5 - methyl - 1,3-dioxan-6-one α-isomer product as a crystalline solid. 2,4-bis(1,1,2-trichloroethyl)5-methyl-1,3 - dioxan - 6 - one α-isomer has a molecular weight of 379.

*Example 3.—2,4-bis(1,1,1-trichloromethyl)-5-methyl-1,3-dioxan-6-one α-isomer*

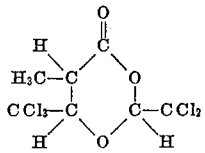

2,4-bis(trichloromethyl) - 5 - methyl-6,6-diethoxy-1,3-dioxane (8.5 grams; 0.02 mole) was mixed with 42.5 grams (115 percent ortho-phosphoric acid equivalent) of polyphosphoric acid and the resulting mixture heated at 85° C. for one hour. Thereafter heating was continued for 17 hours at a temperature of 60° C. Upon completion of the reaction, the reaction mixture was quenched in 100 milliliters of ice-water. A white precipitate formed in the reaction mixture and was separated by filtration. The precipitate was washed with an aqueous sodium carbonate solution and water and dried to obtain a 2,4-bis(1,1,1-trichloromethyl)-5-methyl - 1,3 - dioxan-6-one α-isomer product as a crystalline solid. The product was recrystallized from ethanol and found to melt at 131°–133° C.

In a like manner other 1,3-dioxan-6-ones may be prepared as follows:

2,4-bis(trichloromethyl)-5-ethyl - 1,3 - dioxan - 6-one α-isomer by reacting 2,4-bis(trichloromethyl) - 5 - ethyl-6,6-dimethoxy-1,3-dioxane with polyphosphoric acid.

2,4-bis(trichloromethyl)-5-ethyl-1,3 - dioxan - 6 - one β-isomer by reacting ethyl 2-methyl-3-hydroxy - 4,4,4-trichlorobutyrate with chloral hydrate in the presence of sulfuric acid.

2,4-bis(1,1,2-trichloropropyl) - 5 - methyl - 1,3-dioxan-6-one β-isomer by reacting ethyl 2-methyl-3 - hydroxy-4,4,5-trichloro-caproate with α,α,β-trichloropropionaldehyde hydrate in the presence of sulfuric acid.

2,4-bis(1,1,2-trichloropropyl)-5-methyl - 1,3 - dioxan-6-one α-isomer by reacting 2,4-bis(1,1,2-trichloropropyl)-5-methyl-6,6-dimethoxy-1,3-dioxane with polyphosphoric acid.

The new compounds have been tested and found to be effective as herbicides. For such use, the products may be dispersed on an inert finely divided solid and employed as dusts. Also, such mixtures may be dispersed in water with the aid of a wetting agent and the resulting aqueous suspension employed as sprays. In other procedures, the products may be employed as constituents of oil-in-water emulsions, or water dispersions with or without the aid of wetting, dispersing or emulsifying agents. In a representative operation, substantially complete control of Japanese millet was obtained when 2,4-bis(trichloromethyl) - 5 - methyl-1,3-dioxan - 6 - one α- and β-isomers, respectively, were each applied at a dosage of 50 pounds per acre to soil areas seeded to Japanese millet.

The alkyl 2-alkyl-3-hydroxy-4,4,4-trichloroalkanoates employed as a starting material in the preparation of β-isomers of the compounds of the present invention may be prepared by known methods. In one such method, a 2,4-bis(trichloromethyl)-5-methyl - 6,6 - diethoxy - 1,3-dioxane dissolved in methanol is heated under reflux in the presence of a catalytic amount of sulfuric acid for two hours. Upon completion of the reaction, the reaction mixture was quenched with water and cooled whereupon an ethyl 2-methyl-3-hydroxy-4,4,4-trichlorobutyrate product precipitated in the reaction mixture as a crystalline solid. On recrystallization from ethanol, the product is found to melt at 49.5°–51.5° C.

The 2,4-bis(polychloroalkyl)5-alkyl-6,6' - dialkoxy-1,3-dioxanes employed as a starting material in the present invention may be prepared as described in our copending application, Serial Number 675,544, filed even date herewith. The compounds there described are conveniently prepared by reacting a trialkyl orthoalkanoate having the formula

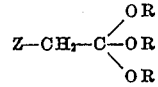

wherein the symbol Z represents a lower alkyl radical and R represents an alkyl radical, with a suitable polychloroaldehyde, i. e., chloral, α,α,β-trichloroaldehyde, and α,α,β-trichlorobutyraldehyde; at a temperature of from 25° to 125° C.

We claim:
1. A 1,3-dioxan-6-one having the formula

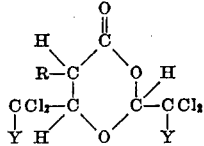

wherein R represents a lower alkyl radical containing from 1 to 4 carbon atoms, inclusive, and Y represents a member selected from the group consisting of chlorine, chloromethyl and α-chloroethyl.

2. 2,4-bis(trichloromethyl) - 5 - methyl-1,3-dioxan-6-one β-isomer.

3. 2,4-bis(trichloromethyl) - 5 - methyl-1,3-dioxan-6-one α-isomer.

4. A method for preparing a 1,3-dioxan-6-one having the formula

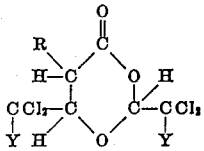

wherein R represents a lower alkyl radical containing from 1 to 4 carbon atoms, inclusive, and Y represents a member selected from the group consisting of chlorine, chloromethyl and α-chloroethyl, which comprises reacting a 2,4-bis(trichloroalkyl) - 5 - alkyl-6,6 - dialkoxy - 1,3-dioxane having the formula

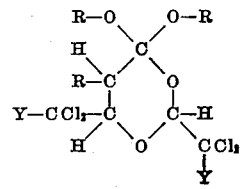

wherein each R represents a lower alkyl radical having from 1 to 4 carbon atoms, inclusive, and Y represents a member selected from the group consisting of chlorine, chloromethyl and α-chloroethyl with polyphosphoric acid, said polyphosphoric acid being employed in at least 25 molecular proportions for each molecular proportion of said dioxane at a temperature of from 10° to 100° C.

References Cited in the file of this patent

UNITED STATES PATENTS 2,807,629    Bell _____ Sept. 24, 1957

OTHER REFERENCES

Wallach: Annalen der Chemie, vol. 193, pages 1–61, 1878.